US008579385B2

(12) United States Patent
Schepp et al.

(10) Patent No.: US 8,579,385 B2
(45) Date of Patent: Nov. 12, 2013

(54) BRAKE SYSTEM FOR A VEHICLE

(75) Inventors: Rene Schepp, Waiblingen (DE);
Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 530 days.

(21) Appl. No.: 12/673,499

(22) PCT Filed: Jul. 7, 2008

(86) PCT No.: PCT/EP2008/058784
§ 371 (c)(1),
(2), (4) Date: Jan. 26, 2011

(87) PCT Pub. No.: WO2009/021778
PCT Pub. Date: Feb. 19, 2009

(65) Prior Publication Data
US 2011/0109152 A1    May 12, 2011

(30) Foreign Application Priority Data

Aug. 14, 2007   (DE) .......................... 10 2007 038 397

(51) Int. Cl.
*B60T 8/40*   (2006.01)
(52) U.S. Cl.
USPC ..... 303/116.1; 303/11; 303/113.2; 303/119.1
(58) Field of Classification Search
USPC ........................... 137/505.18, 505.39, 505.41
See application file for complete search history.

(56) References Cited

U.S. PATENT DOCUMENTS

| 2,660,834 | A | * | 12/1953 | Macglashan, Jr. | ....... 137/505.39 |
|---|---|---|---|---|---|
| 4,168,720 | A | * | 9/1979 | Raskin | ...................... 137/505.18 |
| 4,215,715 | A | * | 8/1980 | Raskin | ...................... 137/505.18 |
| 4,305,423 | A | * | 12/1981 | Adler | ....................... 137/505.13 |
| 4,760,866 | A | * | 8/1988 | Adler | ....................... 137/614.17 |
| 5,921,638 | A | * | 7/1999 | Higashimura et al. | ..... 303/116.1 |
| 6,363,964 | B1 | * | 4/2002 | Carroll | ..................... 137/505.41 |
| 6,382,243 | B2 | * | 5/2002 | Hiddessen et al. | ........ 137/505.18 |
| 6,386,646 | B1 | * | 5/2002 | Hinz et al. | ...................... 303/11 |
| 7,077,158 | B2 | * | 7/2006 | Gerasimov | ............... 137/505.18 |
| 8,342,617 | B2 | * | 1/2013 | Oosawa | ..................... 303/116.1 |

FOREIGN PATENT DOCUMENTS

DE            4202388 A1 *  8/1993

* cited by examiner

*Primary Examiner* — Thomas Irvin
(74) *Attorney, Agent, or Firm* — Maginot, Moore & Beck

(57) ABSTRACT

The invention relates to a brake system for a vehicle, with a main brake cylinder, a fluid control unit, and at least one wheel brake. The fluid control unit has, for brake pressure modulation in at least one brake circuit a switchover valve, an intake valve and a recirculating pump for each brake circuit. According to the invention, the fluid control unit has, for each brake circuit, a sliding valve which is connected into a suction line between the recirculating pump and the main brake cylinder. The sliding valve restricts the effective pressure on a suction side of the recirculating pump to a predeterminable maximum pressure value. In this case, the sliding valve can be arranged in series with or parallel to the intake valve.

16 Claims, 5 Drawing Sheets

BRAKE SYSTEM FOR A VEHICLE

CROSS-REFERENCE TO RELATED APPLICATION

This application is a 35 USC 371 application of PCT/EP2008/058784 filed on Jul. 7, 2008.

BACKGROUND OF THE INVENTION

1. Field of the Invention

The invention is based on a brake system for a vehicle.

2. Description of the Prior Art

From the prior art, brake systems are known that include various safety systems, such as an anti-lock system (ABS), electronic stability program (ESP), and so forth, and perform various safety functions, such as an anti-lock function, traction control (TC), and so forth. FIG. 1 shows a brake system with which various safety functions can be performed. As can be seen from FIG. 1, a conventional brake system 1 for a vehicle includes a master cylinder 2, a fluid control unit 3, and four wheel brakes 4.1 through 4.4, which each have an associated wheel brake cylinder. Two each of the four wheel brakes 4.1 through 4.4 are associated with a brake circuit 10, 20, and each brake circuit 10, 20 is connected to the master cylinder 2. Hence a first wheel brake 4.1, which is disposed for instance on the left rear axle of the vehicle, and a second wheel brake 4.2, which is disposed for instance on the right front axle of the vehicle, are assigned to a first brake circuit 10, and a third wheel brake 4.3, which is disposed for instance on the left front axle of the vehicle, and a fourth wheel brake 4.4, which is disposed for instance on a right rear axle of the vehicle, are assigned to a second brake circuit 20. One inlet valve 13.1, 13.2, 23.1, 23.2 and one outlet valve 14.1, 14.2, 24.1, 24.2 is assigned to each wheel brake 4.1 through 4.4, and via the various inlet valves 13.1, 13.2, 23.1, 23.2, pressure in the corresponding wheel brake 4.1 through 4.4 can be built up, and via the various outlet valves 14.1, 14.2, 24.1, 24.2, pressure in the corresponding wheel brake 4.1 through 4.4 can be reduced. As can also be seen from FIG. 1, the first wheel brake 4.1 is assigned a first inlet valve 13.1 and a first outlet valve 14.1; the second wheel brake 4.2 is assigned a second inlet valve 13.2 and a second outlet valve 14.2; the third wheel brake 4.3 is assigned a third inlet valve 23.2 and a third outlet valve 24.2; and the fourth wheel brake 4.4 is assigned a fourth inlet valve 23.1 and a fourth outlet valve 24.1. Moreover, the first brake circuit 10 has a first intake valve 11, a first switchover valve 12, a first fluid reservoir 16, and a first recirculating pump 15. The second brake circuit 20 additionally has a second intake valve 21, a second switchover valve 22, a second fluid reservoir 26, and a second recirculating pump 25, and the first and second recirculating pumps 15, 25 are driven by a common electric motor 35. The fluid control unit 3, for ascertaining the actual brake pressure, also includes a sensor unit 30. For brake pressure modulation in the first brake circuit 10, the fluid control unit 3 uses the first switchover valve 12, the first intake valve 11, and the first recirculating pump 15, and for brake pressure modulation in the second brake circuit 20, it uses the second switchover valve 22, the second intake valve 22, and the second recirculating pump 25.

The recirculating pumps 15, 25 of the two brake circuits can be embodied for instance as piston pumps or geared pumps. During an ESP regulating action, a brake pressure of up to 140 bar can be adjusted by the intake valves 11 and 21 that have been switched open, and with that pressure the suction side of the corresponding recirculating pump 15, 25 is loaded when braking has to be done in the system. In a partly active system state as well, the recirculating pump 15, 25 can be subjected on the suction side to up to 140 bar. A pilot pressure on the suction side of the recirculating pump 15, 25 can occur as well, if the pressure of the master cylinder 2 is conducted via the open switchover valves 12 and 22 to the recirculating pumps 15, 25 and is then boosted, up to the wheel pressure necessary for the regulating action, via the corresponding recirculating pump 15 or 25. In a version of the recirculating pumps 15, 25 as piston pumps, this high pressure, which acts on a seal on the cam side of the recirculating pump 15, 25, can lead to very high wear, extrusion, and hence increased leakage. If a geared pump is used as the recirculating pump 15, 25, then this high pressure puts a burden on wave sealing rings of the recirculating pumps 15, 25, which can lead to increased friction and as in the piston pump to increased wear of the seals, and high-pressure-resistant wave sealing rings are quite expensive.

ADVANTAGES AND SUMMARY OF THE INVENTION

The brake system of the invention for a vehicle has the advantage over the prior art that a fluid control unit for each brake circuit has a slide valve, which is ground into a suction line between a recirculating pump and a master cylinder, and the slide valve limits the effective pressure on a suction side of the recirculating pump to a predeterminable maximum pressure value, for instance of 6 bar. As a result, it is advantageously prevented that at a seal toward the cam chamber of a recirculating pump embodied as a piston pump, or at the wave seal rings of a recirculating pump embodied as a geared pump, high pressures of over 100 bar will be applied during system operation. The limitation of the effective pressure on the suction side of the recirculating pump makes it possible to reduce wear, friction, and extrusion of the seals in the recirculating pump, as a result of which it is advantageously also possible to reduce leakage from the recirculating pump to the outside, increase the efficiency, and lengthen the service life of the recirculating pump markedly. In a recirculating pump embodied as a geared pump, an expensive, complex and high-pressure-resistant wave sealing ring is furthermore avoided, and an inexpensive wave seal can be built in.

It is especially advantageous that the slide valve has a master cylinder connection, a pump connection, and a pressure-relieved connection to the atmosphere. A longitudinally movable piston is subjected by an adjusting spring to a spring force on the pressure-relieved side and in an outset position completely opens a communication, existing via a piston bore, between the master cylinder connection and the pump connection. If a pressure builds up in the slide valve, then the piston is moved in the direction of the pressure-relieved connection, counter to the spring force of the adjusting spring. As a result of the piston motion, the communication between the master cylinder connection and the pump connection is reduced. If the predeterminable maximum pressure value is reached, then the communication between the master cylinder connection and the pump connection is completely interrupted by means of a stop position of the piston, so that advantageously, an elevated pressure cannot build up on the suction side of the recirculating pump. If the actual pressure in the slide valve drops below the maximum pressure value, then the piston is moved out of the stop position back in the direction of the outset position by the spring force of the adjusting spring. As a result, it is advantageously ensured that the pressure in the line to the master cylinder can build up, without causing the pressure in the suction side of the recirculating pump to rise above the predeterminable maximum pressure value. The maximum pressure value can be adjusted and predetermined for instance via the spring properties of the adjusting spring.

In an embodiment of the brake system of the invention, the master cylinder connection of the slide valve communicates with the master cylinder via the intake valve; that is, the slide valve and the intake valve are connected in series in the suction line between the recirculating pump and the master cylinder. During a suction mode of the recirculating pump, the piston of the slide valve remains in the outset position, in which the master cylinder connection communicates with the pump connection via the piston bore. During a partly active state of the brake system, the piston is subjected by the recirculating pump, via the pump connection, to a pressure which moves the piston in the direction of the pressure-relieved connection, counter to the spring force of the adjusting spring, and upon reaching the maximum pressure value and the corresponding stop position, the piston completely interrupts the communication between the master cylinder connection and the pump connection. As a result, any further pressure buildup at the pump connection to the recirculating pump is advantageously averted. A seal between the piston and the housing is embodied such that corresponding leakage is so slight that the recirculating pump when in operation is capable of pumping that volume, and thus no further pressure can build up as a consequence of the leakage. If the actual pressure in the slide valve drops below the maximum pressure value, for instance as a result of the delivery capacity of the recirculating pump, then the piston is moved by the spring force of the adjusting spring out of the stop position back in the direction of the outset position, as a result of which the communication between the master cylinder connection and the pump connection is opened up again.

Alternatively, the master cylinder connection of the slide valve communicates with the master cylinder; that is, the slide valve and the intake valve are connected parallel, and each of them connect the suction side of the recirculating pump to the master cylinder. In this alternative embodiment, the slide valve includes a stepped piston, which has a first diameter toward the pressure-relieved connection and a second diameter toward the pump connection, and the second diameter is greater than the first diameter. A transition of the piston from the first diameter to the second is embodied as a sealing cone, which corresponds with a sealing seat in the housing. In the pressureless state, the piston of the slide valve remains in the outset position, in which the master cylinder connection communicates with the pump connection via the piston bore.

During an ABS action, the piston is acted upon by the master cylinder via the master cylinder connection by a pressure that moves the piston in the direction of the pressure-relieved connection, counter to the spring force of the adjusting spring, and upon attainment of the maximum pressure value and the corresponding stop position, in which the sealing cone of the piston provides sealing in the sealing seat of the housing, the piston completely interrupts the communication between the master cylinder connection and the pump connection. As a result, the flow from the master cylinder to the recirculating pump is prevented, and the fluid control unit can carry out a normal ABS regulating action.

During a partly active state of the brake system, in which the pressure in the line to the master cylinder rises, the piston of the slide valve is subjected by the master cylinder connection to a pressure which moves the piston in the direction of the pressure-relieved connection, counter to the spring force of the adjusting spring, and upon attainment of the maximum pressure value and the corresponding stop position, the piston completely interrupts the communication between the master cylinder connection and the pump connection. If the actual pressure in the slide valve drops below the maximum pressure value, then the spring force of the adjusting spring moves the piston out of the stop position in the direction of the outset position, and the communication between the master cylinder connection and the pump connection is opened up again.

During an ESP action, the piston of the slide valve remains in the outset position, and in this state, the recirculating pump aspirates fluid in parallel via the slide valve and the intake valve. As a result, advantageously, the pressure loss via the intake valve and the slide valve can be reduced. Especially at low temperatures and with high-viscosity fluid, this can lead to an improvement in the pressure buildup dynamics. If the slide valve is embodied with a suitably large cross section, then the intake valve can be embodied as a simple outlet valve, which has a greater flow resistance but is less expensive, or else the intake valve can be omitted.

BRIEF DESCRIPTION OF THE DRAWINGS

The invention is described in further detail below in conjunction with the drawings, in which.

DESCRIPTION OF THE PREFERRED EMBODIMENTS

Figure 1:
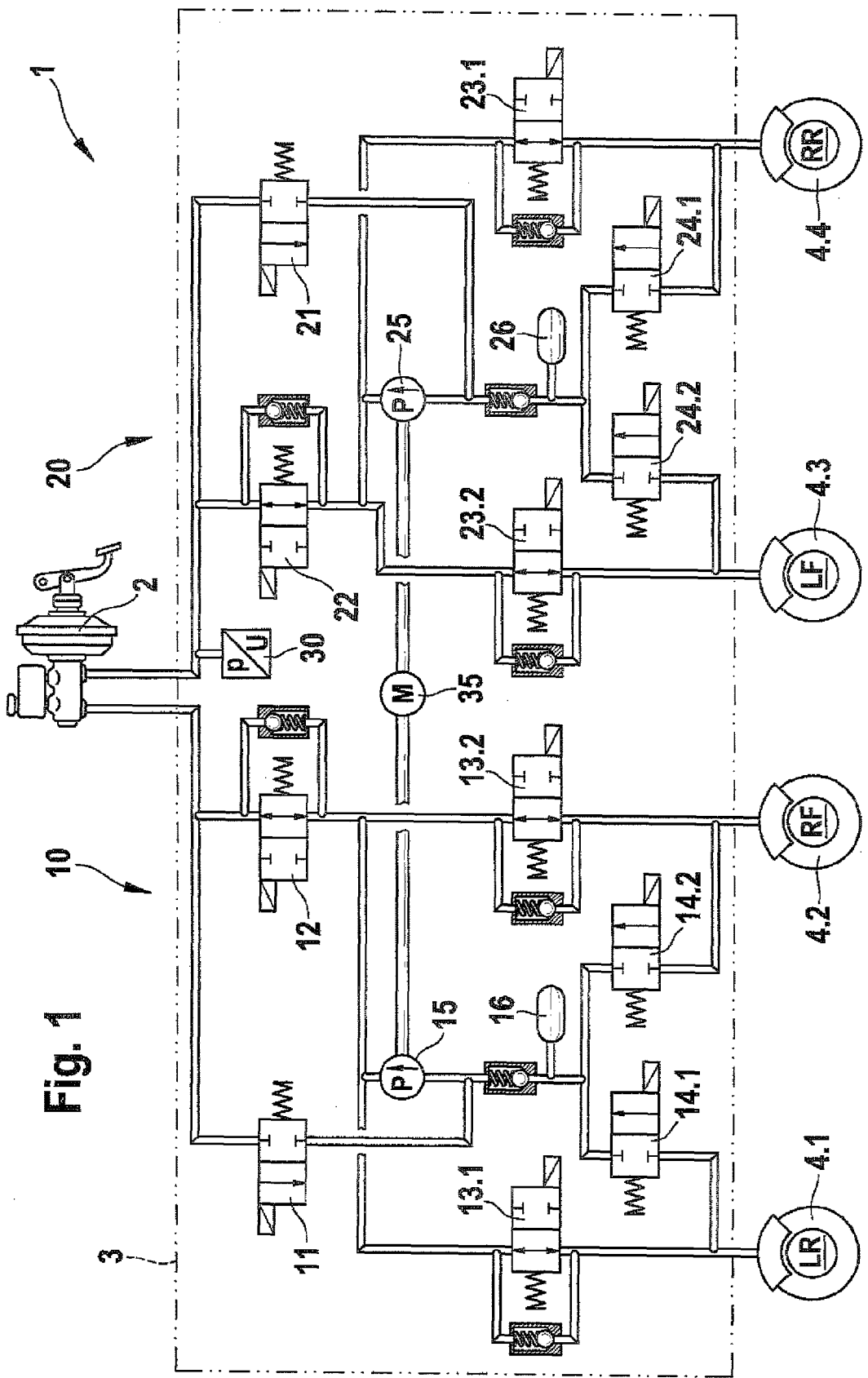
FIG. 1 shows a schematic block diagram of a conventional brake system.

In the drawings, the same reference numerals identify elements and components that perform the same or analogous functions.

Figure 2:
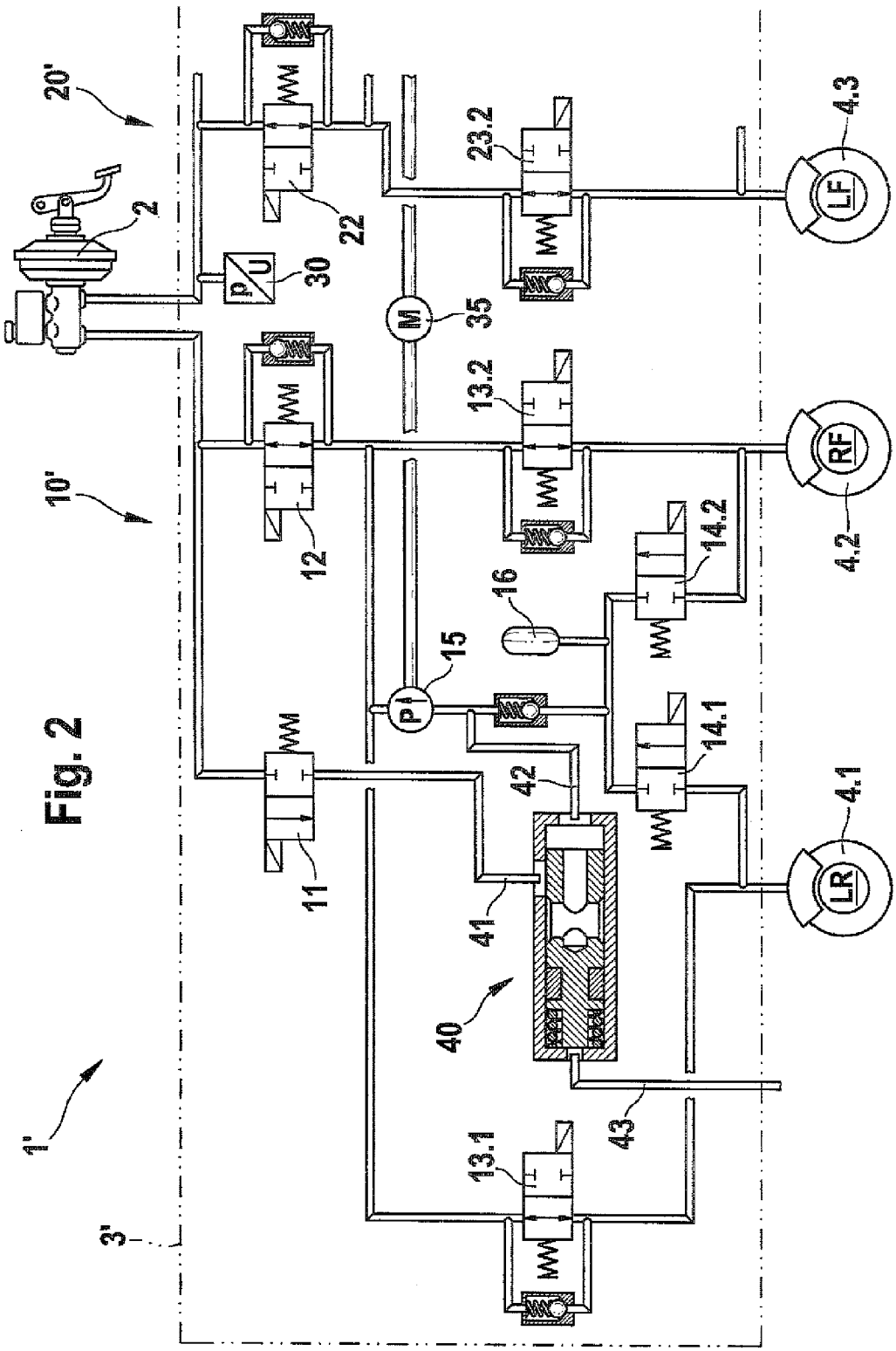
FIG. 2 shows a schematic block diagram of a first exemplary embodiment of a brake system of the invention.

The first exemplary embodiment, shown in FIG. 2, of a brake system 1' of the invention for a vehicle is constructed essentially identically to the conventional brake system 1 of FIG. 1 and includes many components that perform the same or analogous functions as in the conventional brake system 1. Thus the first exemplary embodiment of the brake system 1' of the invention for a vehicle includes a master cylinder 2, a fluid control unit 3', and four wheel brakes 4.1 through 4.4, and the brake system 1' is subdivided into two identically constructed brake circuits 10' and 20'. To simplify the description, in FIG. 2 only a first brake circuit 10' is shown fully and will be described in detail. As can be seen from FIG. 2, a first wheel brake 4.1, which is disposed for instance on the left rear axle of the vehicle, and a second wheel brake 4.2, which is disposed for instance on the front right axle of the vehicle, are assigned to the first brake circuit 10'. The first and second wheel brakes 4.1 and 4.2 are each assigned a respective inlet valve 13.1, 13.2 and outlet valve 14.1, 14.2; via the inlet valves 13.1, 13.2, pressure can be built up in the corresponding wheel brakes 4.1 and 4.2, and via the outlet valves 14.1, 14.2, pressure in the corresponding wheel brakes 4.1 and 4.2 can be each reduced. For modeling the brake pressure, the first brake circuit 10' has a first intake valve 11, a first switchover valve 12, a first fluid reservoir 16, and a first recirculating pump 15, which is embodied for instance as a piston pump or geared pump and is driven by an electric motor 35. The fluid control unit 3', for ascertaining the actual brake pressure, further includes a sensor unit 30. As can also be seen from FIG. 2, the fluid control unit 3', for each brake circuit 10', 20', has one additional slide valve 40, which is ground into a suction line between the recirculating pump 15 and the intake valve 11, so that the recirculating pump 15 communicates on the suction side with the master cylinder 2, via the slide valve 40 and the intake valve 11. The slide valve 40 limits the effective pressure on the suction side of the recirculating pump 15 to a predeterminable maximum pressure value. The maximum pressure value may be predetermined for instance as a pressure limit value in the range of from 4 to 10 bar. Preferably, a maximum pressure value of approximately 6 bar is predetermined. It is thereby prevented that during system operation, high pressures of over 100 bar will be applied at a seal toward the cam chamber of a recirculating pump 15 embodied as a piston pump or to wave sealing rings of a recirculating pump 15 embodied as a geared pump, so that wear, friction, and extrusion of the seals of the recirculating pump 15 can be reduced. As a result, leakage from the recirculating pump 15 to the outside can advantageously be reduced, the efficiency can be increased, and the service life of the recirculating pump 15 can be lengthened markedly. In a recirculating pump 15 embodied as a geared pump, an expensive, complex and high-pressure-resistant wave sealing ring is also avoided, and an inexpensive wave seal can be built in.

Figure 3A:
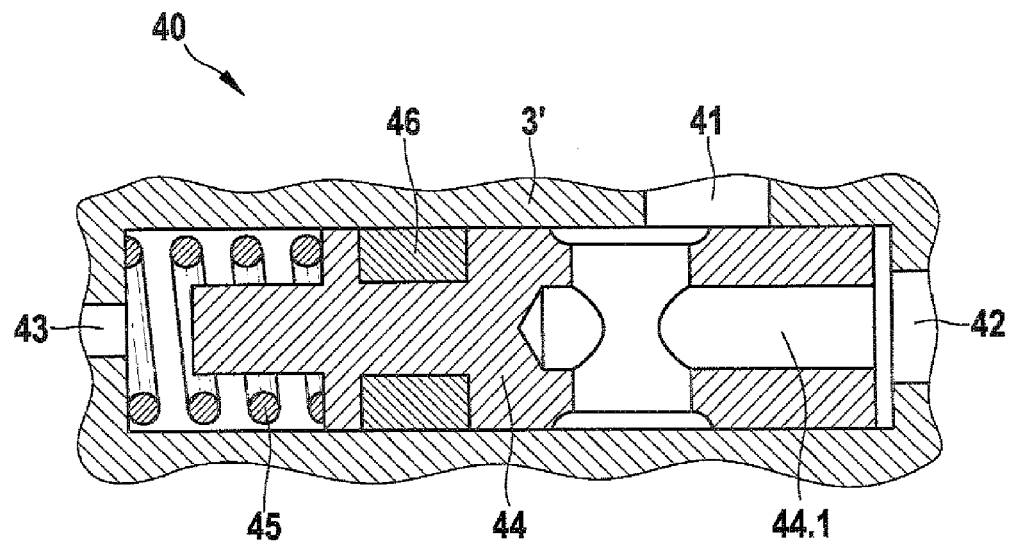
FIGS. 3a and 3b each show a schematic sectional view of a first exemplary embodiment of a slide valve for the brake system of the invention as shown in FIG. 2.
Figure 3B:
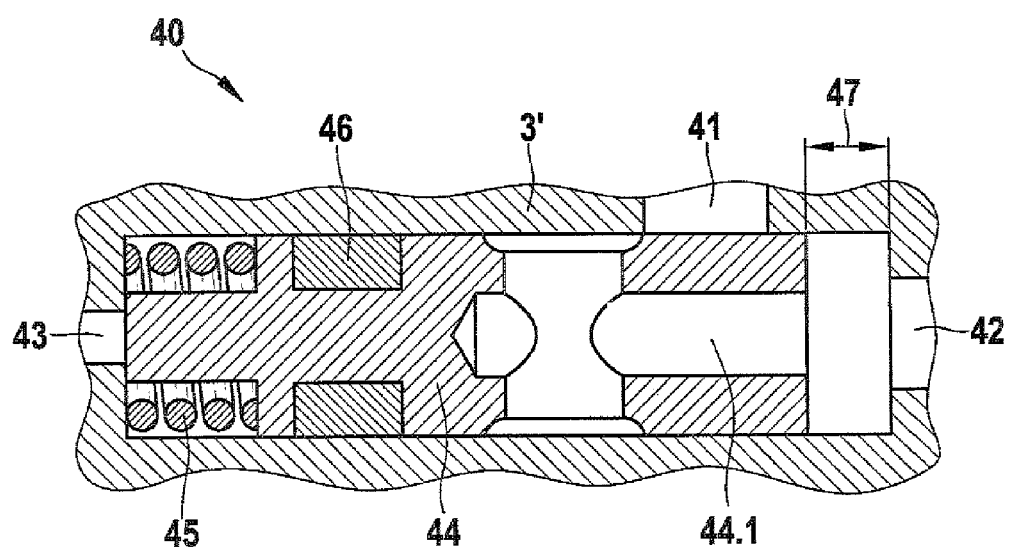

As is FIGS. 3a and 3b, the slide valve 40 has a master cylinder connection 41, a pump connection 42, a pressure-relieved connection 43 to the atmosphere, and a longitudinally movable piston 44 that is sealed off from the housing and from the pressure-relieved connection 43 via a seal 46. On the pressure-relieved side, the longitudinally movable piston 44 is subjected to a spring pressure by an adjusting spring 45, and in an outset position, which is shown in FIG. 3a, it completely opens a communication, existing via a piston bore 44.1, between the master cylinder connection 41 and the pump connection 42. During a suction mode of the recirculating pump 15, the piston 44 of the slide valve 40 remains in the outset position, in which the communication between the master cylinder connection 41 and the pump connection 42 is completely opened. During a partly active state of the brake system the piston 44 is acted upon from the direction of the pump connection 42 by a pressure that moves the piston 44 in the direction of the pressure-relieved connection 43, counter to the spring force of the adjusting spring 45, and the communication between the master cylinder connection 41 and the pump connection 42 is reduced as a result of the piston motion. Upon attainment of the maximum pressure value, the piston 44 is located in a corresponding stop position, which is shown in FIG. 3b and in which the communication between the master cylinder connection 41 and the pump connection 42 is completely interrupted by the piston 44. As a result, a further pressure buildup toward the recirculating pump 15 is prevented. The maximum pressure value can be adjusted for instance via the spring properties of the adjusting spring 45. Preferably, the maximum pressure value is adjusted to approximately 6 bar. The metal seal between the piston 44 and the housing is embodied such that only slight leakage occurs, whose volume the running pump can easily pump. As a consequence of the leakage, further pressure can therefore not build up. If the actual pressure in the slide valve 40 drops below the maximum pressure value again, then the piston 44 is moved by the spring force of the adjusting spring 45 out of the stop position back in the direction of the outset position, as a result of which the communication between the master cylinder connection 41 and the pump connection 42 is opened up again. It is thus ensured that the pressure in the line to the master cylinder 2 can build up, without causing the pressure in the suction side of the recirculating pump 15 to rise above the predeterminable maximum pressure value. In FIG. 3b, reference numeral 47 indicates the maximum stroke of the piston 44.

Figure 4:
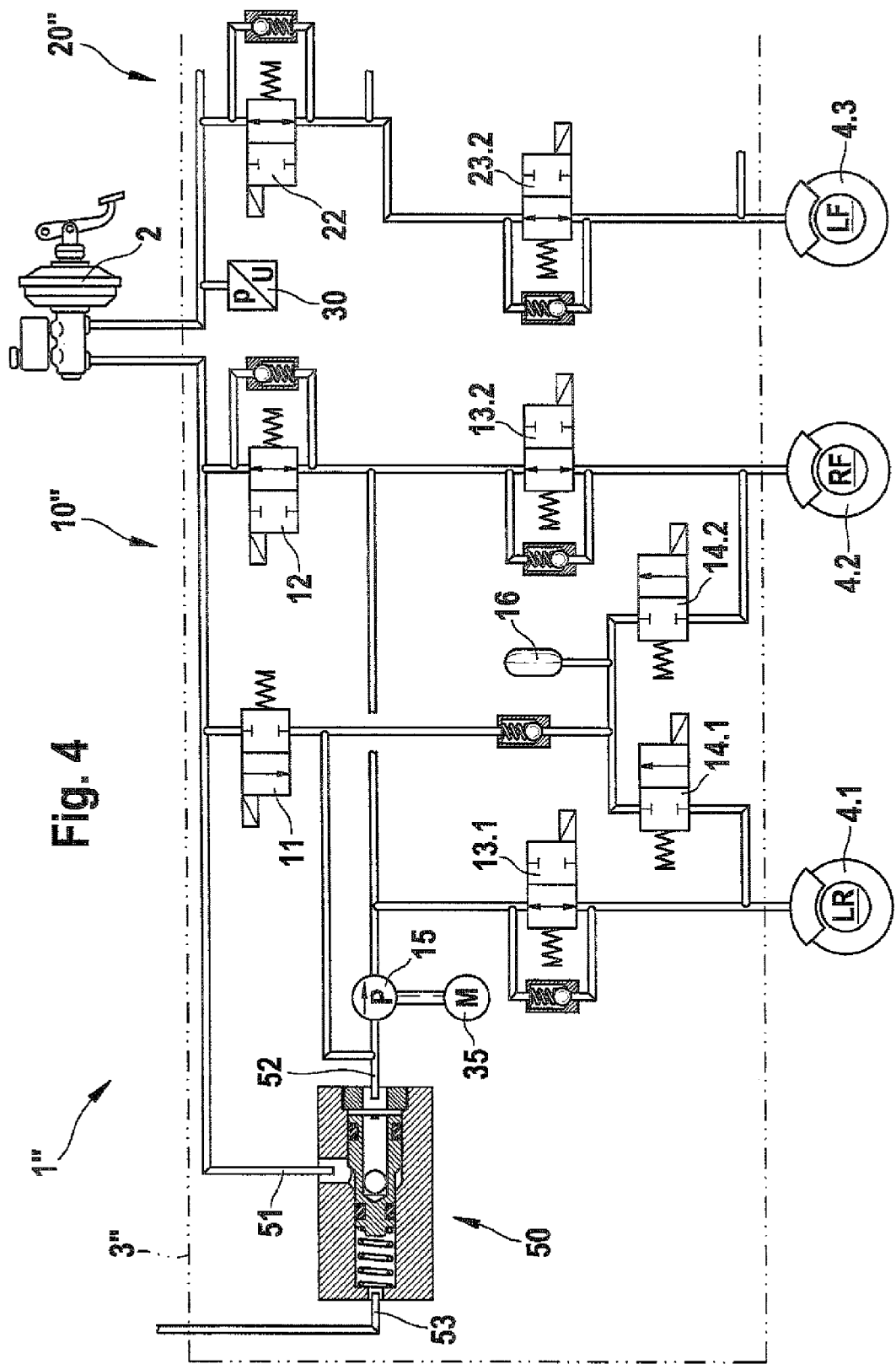
FIG. 4 shows a schematic block diagram of a second exemplary embodiment of a brake system of the invention.

The second exemplary embodiment, shown in FIG. 4, of a brake system 1" of the invention for a vehicle is essentially constructed identically to the first exemplary embodiment of the brake system 1' of the invention in FIG. 2 and includes the same components that perform the same or analogous functions. Thus the second exemplary embodiment of the brake system 1" of the invention for a vehicle includes a master cylinder 2, a fluid control unit 3" and four wheel brakes 4.1 through 4.4, and the brake system 1" is again subdivided into two identically constructed brake circuits 10" and 20"; of these, to simplify the description, once again only a first brake circuit 10" is shown in its entirety in FIG. 4 and described in detail. Since the two exemplary embodiments of the brake system 1" of the invention include essentially the same components, only the differences between the second exemplary embodiment of the brake system 1" and the first exemplary embodiment of the brake system 1' will now be described, to avoid repetition.

As can also be seen from FIG. 4, for each brake circuit 10", 20", the fluid control unit 3", analogously to the first exemplary embodiment of the brake system 1' of FIG. 2, has one additional slide valve 50, which is ground into a suction line between the recirculating pump 15 and the master cylinder 2, so that on the suction side, the recirculating pump 15 communicates with the master cylinder 2 via the slide valve 50 or the intake valve 11; that is, the slide valve 50 is connected parallel to the intake valve 11. The slide valve 50 limits the effective pressure on the suction side of the recirculating pump 15 to the predeterminable maximum pressure value of preferably approximately 6 bar. Thus, in the second exemplary embodiment of the brake system 1" of the invention as well, it is thereby prevented that during system operation, high pressures of over 100 bar will be applied at a seal toward the cam chamber of a recirculating pump 15 embodied as a piston pump or to wave sealing rings of a recirculating pump 15 embodied as a geared pump, so that wear, friction, and extrusion of the seals of the recirculating pump 15 can be reduced. As a result, leakage from the recirculating pump 15 to the outside can advantageously be reduced, the efficiency can be increased, and the service life of the recirculating pump can be lengthened markedly. In a recirculating pump embodied as a geared pump, an expensive, complex and high-pressure-resistant wave sealing ring is also avoided, and an inexpensive wave seal can be built in.

Figure 5A:
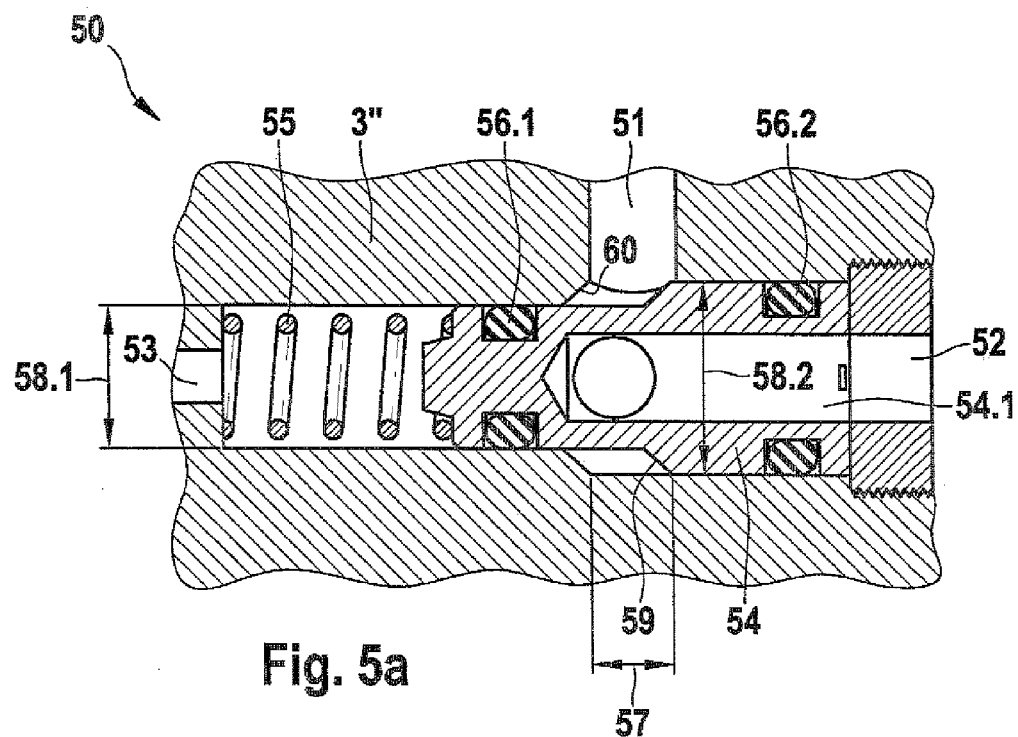
FIGS. 5a and 5b each show a schematic sectional view of a second exemplary embodiment of a slide valve for the brake system of the invention as shown in FIG. 4.
Figure 5B:
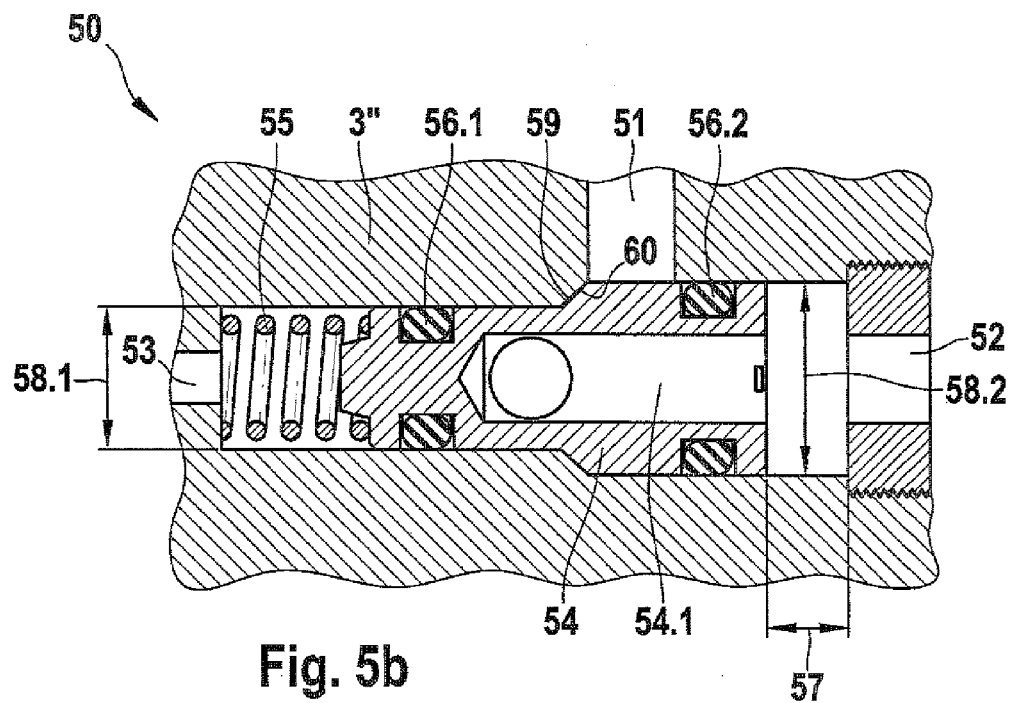

As can be seen from FIGS. 5a and 5b, the slide valve 50 has a master cylinder connection 51, a pump connection 52, a pressure-relieved connection 53 to the atmosphere, and a longitudinally movable piston 54. In a distinction from the slide valve 40 of the first exemplary embodiment, the longitudinally movable piston 54 of the slide valve 50 is embodied as a stepped piston 54, which has a first diameter 58.1 toward a pressure-relieved connection 53 and a second diameter 58.2 toward a pump connection 52, and the second diameter 58.2 is greater than the first diameter 58.1. The piston 54 is sealed off from the housing with respect to the pressure-relieved connection 53 and to the pump connection 52 via a respective sealing ring 56.1 and 56.2. A transition of the piston 54 from the first diameter 58.1 to the second diameter 58.2 is embodied as a sealing cone 59, which corresponds with a sealing seat in the housing.

The longitudinally movable piston 54 is subjected on the pressure-relieved side to a spring force by an adjusting spring 55, and in a pressureless state it remains in an outset position, which is shown in FIG. 5a, in which a communication, existing via a piston bore 54.1, between the master cylinder connection 51 and the pump connection 52 is completely opened. During an ABS action, the piston 54 is subjected from the direction of the master cylinder connection 51 to a pressure that moves the piston 54 in the direction of the pressure-relieved connection 53, counter to the spring force of the adjusting spring 55. Upon attainment of the maximum pressure value and the corresponding stop position, which is shown in FIG. 5b, the sealing cone 59 of the piston 54 provides sealing in the sealing seat 60 of the housing, and the communication between the master cylinder connection 51 and the pump connection 52 is completely interrupted by the piston 54. As a result, the flow from the master cylinder 2 to the recirculating pump 15 is prevented, and in this state, the fluid control unit 3" can perform an ABS regulating action.

During a partly active state of the brake system, the piston 54 of the slide valve 50 is acted upon from the direction of the master cylinder connection by a pressure that moves the piston 54 in the direction of the pressure-relieved connection 53, counter to the spring force of the adjusting spring 55, and the communication between the master cylinder connection 51 and the pump connection 52 is reduced as a result of the piston motion. Upon attainment of the maximum pressure value of approximately 6 bar, the piston 54 is in the corresponding stop position, which is shown in FIG. 5b, in which the communication between the master cylinder connection 51 and the pump connection 52 is completely interrupted by the piston 54. As a result, any further pressure buildup toward the recirculating pump 15 is prevented. If the actual pressure in the slide valve 50 drops below the maximum pressure value of approximately 6 bar, then the spring force of the adjusting spring 55 moves the piston 54 out of the stop position in the direction of the outset position, as a result of which the communication between the master cylinder connection 51 and the pump connection 52 is opened up again. It is thus ensured that the pressure in the line to the master cylinder 2 can build up, without causing the pressure in the suction side of the recirculating pump 15 to rise above the predeterminable maximum pressure value. In FIG. 5b, reference numeral 57 indicates the maximum stroke of the piston 54.

During an ESP action, the piston 54 of the slide valve 50 remains in the outset position, and in this state, the recirculating pump 15 aspirates fluid in parallel via the slide valve 50 and the intake valve 11. As a result, the pressure loss via the intake valve 11 and the slide valve 50 is reduced, so that especially at low temperatures and with high-viscosity fluid, the pressure buildup dynamics can be improved. If the slide valve 50 is embodied with a suitably large cross section, then the intake valve 11 can be embodied as a simple outlet valve, which has a higher flow resistance but is less expensive, or the intake valve 11 can be omitted entirely.

By means of the brake systems according to the invention, it is advantageously prevented that a high pressure of over 100 bar will be applied to the recirculating pumps. As a result, wear, friction, and extrusion of the seals of the recirculating pumps can be reduced, and thus the leakage from the recirculating pump to the outside can also be reduced and the efficiency can be increased. In a version of the recirculating pump as a geared pump, expensive, complex and high-pressure-resistant wave sealing rings can furthermore be replaced by simple inexpensive wave seals.

The foregoing relates to the preferred exemplary embodiments of the invention, it being understood that other variants and embodiments thereof are possible within the spirit and scope of the invention, the latter being defined by the appended claims.

The invention claimed is:

1. A brake system for a vehicle, comprising:
   a master cylinder;
   at least one brake circuit;
   at least one wheel brake; and
   a fluid control unit configured to modulate brake pressure at the at least one wheel brake and including a switchover valve, an intake valve, a recirculating pump, and a slide valve for each brake circuit in the at least one brake circuit,
   wherein the slide valve, is positioned in a suction line between the recirculating pump and the master cylinder,
   wherein the slide valve limits an effective pressure on a suction side of the recirculating pump to a predeterminable maximum pressure value,
   wherein the slide valve includes (i) a master cylinder connection, (ii) a pump connection, (iii) a pressure relieved connection, (iv) a longitudinally movable stepped piston defining a piston bore, (v) an adjusting spring, and (vi) a housing defining a sealing seat,
   wherein the stepped piston is subjected to a spring force from the adjusting spring that urges the stepped piston into an outset position in which a fluid communication between the master cylinder connection and the pump connection, via the piston bore, is completely open,
   wherein the stepped piston includes (i) a first region toward the pressure relieved connection that has a first diameter, (ii) a second region toward the pump connection that has a second diameter, which is greater than the first diameter, and (iii) a transition region interposed between the first region and the second region that has a frustoconical shape defining a sealing cone, and
   wherein the sealing cone fits complementarily into the sealing seat to enable the sealing cone to seal against the sealing seat.

2. The brake system as defined by claim 1, wherein:
   a pressure buildup in the slide valve moves the stepped piston against the spring force of the adjusting spring in a direction of the pressure relieved connection,
   the fluid communication between the master cylinder connection and the pump connection is reduced as a result of the stepped piston moving in the direction of the pressure relieved connection,
   when an actual pressure in the slide valve reaches the predeterminable maximum pressure value, the fluid communication between the master cylinder connection and the pump connection is completely interrupted by the stepped piston at a stop position where the sealing cone seals against the sealing seat, and and
   the spring force of the adjusting spring moves the stepped piston out of the stop position in a direction of the outset position when the actual pressure in the slide valve drops below the predeterminable maximum pressure value.

3. The brake system as defined by claim 2, wherein a master cylinder connection of the slide valve communicates with the master cylinder via the intake valve.

4. The brake system as defined by claim 3, wherein the piston of the slide valve remains in the outset position during a suction mode of the recirculating pump and during a partly active state of the brake system is subjected to a pressure which moves the piston, counter to the spring force of the adjusting spring, in the direction of the pressure-relieved connection; and upon attainment of the maximum pressure value and the corresponding stop position, the piston completely interrupts the communication between the master cylinder connection and the pump connection; and the spring force of the adjusting spring moves the piston out of the stop position in the direction of the outset position when the actual pressure in the slide valve drops below the maximum pressure value.

5. The brake system as defined by claim 2, wherein the master cylinder connection of the slide valve communicates directly with the master cylinder.

6. The brake system as defined by claim 5, wherein:
the stepped piston of the slide valve is configured to remain in the outset position in a pressureless state, and during an anti-lock braking system action the stepped piston is subjected by the master cylinder connection to an increased pressure which moves the piston, counter to the spring force of the adjusting spring, in the direction of the pressure-relieved connection,
the stepped piston is configured to completely interrupt the fluid communication between the master cylinder connection and the pump connection when the actual pressure in the slide valve reaches the maximum pressure value and the stepped piston reaches the stop position, in which the sealing cone of the stepped piston seals against the sealing seat of the housing, to enable the fluid control unit to execute the anti-lock braking system action.

7. The brake system as defined by claim 5, wherein:
an increased pressure from the master cylinder connection acts on the stepped piston of the slide valve during a partly active state of the brake system to move the stepped piston, counter to the spring force of the adjusting spring, in the direction of the pressure-relieved connection; and
the stepped piston is configured to completely interrupt the fluid communication between the master cylinder connection and the pump connection when the actual pressure in the slide valve reaches the maximum pressure value and the stepped piston reaches the stop position, in which the sealing cone of the stepped piston seals against the sealing seat of the housing, and
the spring force of the adjusting spring moves the stepped piston out of the stop position in the direction of the outset position when the actual pressure in the slide valve drops below the predeterminable maximum pressure value.

8. The brake system as defined by claim 1, wherein a master cylinder connection of the slide valve communicates with the master cylinder via the intake valve.

9. The brake system as defined by claim 8, wherein the piston of the slide valve remains in the outset position during a suction mode of the recirculating pump and during a partly active state of the brake system is subjected to a pressure which moves the piston, counter to the spring force of the adjusting spring, in the direction of the pressure-relieved connection; and upon attainment of the maximum pressure value and the corresponding stop position, the piston completely interrupts the communication between the master cylinder connection and the pump connection; and the spring force of the adjusting spring moves the piston out of the stop position in the direction of the outset position when the actual pressure in the slide valve drops below the maximum pressure value.

10. The brake system as defined by claim 1, wherein the master cylinder connection of the slide valve communicates directly with the master cylinder.

11. The brake system as defined by claim 10, wherein:
the stepped piston of the slide valve is configured to remain in the outset position in a pressureless state,
during an anti-lock braking system action the stepped piston is subjected by the master cylinder connection to an increased pressure which moves the piston, counter to the spring force of the adjusting spring, in a direction of the pressure-relieved connection, and
the stepped piston is configured to completely interrupt the fluid communication between the master cylinder connection and the pump connection when an actual pressure in the slide valve reaches the maximum pressure value and the stepped piston reaches a stop position, in which the sealing cone of the stepped piston seals against the sealing seat of the housing, to enable the fluid control unit to execute the anti-lock braking system action.

12. The brake system as defined by claim 11, wherein:
an increased pressure from the master cylinder connection acts on the stepped piston of the slide valve during a partly active state of the brake system to move the stepped piston, counter to the spring force of the adjusting spring, in the direction of the pressure-relieved connection; and
the stepped piston is configured to completely interrupt the fluid communication between the master cylinder connection and the pump connection when the actual pressure in the slide valve reaches the maximum pressure value and the stepped piston reaches the stop position, in which the sealing cone of the stepped piston seals against the sealing seat of the housing, and
the spring force of the adjusting spring moves the stepped piston out of the stop position in a direction of the outset position when the actual pressure in the slide valve drops below the predeterminable maximum pressure value.

13. The brake system as defined by claim 10, wherein:
an increased pressure from the master cylinder connection acts on the stepped piston of the slide valve during a partly active state of the brake system to move the stepped piston, counter to the spring force of the adjusting spring, in a direction of the pressure-relieved connection; and
the stepped piston is configured to completely interrupt the fluid communication between the master cylinder connection and the pump connection when an actual pressure in the slide valve reaches the maximum pressure value and the stepped piston reaches a stop position, in which the sealing cone of the stepped piston seals against the sealing seat of the housing, and
the spring force of the adjusting spring moves the stepped piston out of the stop position in a direction of the outset position when the actual pressure in the slide valve drops below the predeterminable maximum pressure value.

14. The brake system as defined by claim 10, wherein:
the stepped piston of the slide valve remains in the outset position during an electronic stability program action, and
during the electronic stability program action, the recirculating pump aspirates fluid in parallel via the slide valve and the intake valve.

15. The brake system as defined by claim 5, wherein:
the stepped piston of the slide valve remains in the outset position during an electronic stability program action, and
during the electronic stability program action, the recirculating pump aspirates fluid in parallel via the slide valve and the intake valve.

16. The brake system as defined by claim 1, wherein the pressure relieved connection is open to atmosphere.

* * * * *

UNITED STATES PATENT AND TRADEMARK OFFICE
CERTIFICATE OF CORRECTION

PATENT NO. : 8,579,385 B2  
APPLICATION NO. : 12/673499  
DATED : November 12, 2013  
INVENTOR(S) : Schepp et al.

Page 1 of 1

It is certified that error appears in the above-identified patent and that said Letters Patent is hereby corrected as shown below:

On the title page, the following foreign patent should be added to the listings under the following headings:

(56)      References Cited

U.S. PATENT DOCUMENTS

| | | | |
|---|---|---|---|
| 5,226,701 | A | 7/1993 | Lebret et al. ............ 07/789,216 |
| 2002/0050738 | A1 | 5/2002 | Hinz et al. |
| 2006/0113835 | A1 | 6/2006 | Krueger et al. |
| 2008/0201049 | A1 | 8/2008 | Bodmann |

FOREIGN PATENT DOCUMENTS

| | | | |
|---|---|---|---|
| DE | 4202388 | A1 | 8/1993 |
| DE | 102004056661 | A1 | 6/2006 |
| DE | 0488833 | A1 | 6/1992 |
| WO | 9800323 | A1 | 1/1998 |
| WO | 2007012562 | A1 | 2/2007 |

Signed and Sealed this  
Eighteenth Day of November, 2014

Michelle K. Lee  
*Deputy Director of the United States Patent and Trademark Office*